United States Patent
Zhang

(10) Patent No.: US 10,431,000 B2
(45) Date of Patent: Oct. 1, 2019

(54) ROBUST MESH TRACKING AND FUSION BY USING PART-BASED KEY FRAMES AND PRIORI MODEL

(71) Applicant: SONY CORPORATION, Tokyo (JP)

(72) Inventor: Qing Zhang, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/653,363

(22) Filed: Jul. 18, 2017

(65) Prior Publication Data

US 2019/0026942 A1    Jan. 24, 2019

(51) Int. Cl.
*G06T 17/20* (2006.01)
*G06T 15/20* (2011.01)
*G06T 7/55* (2017.01)
*G06T 7/246* (2017.01)

(52) U.S. Cl.
CPC ............ *G06T 17/205* (2013.01); *G06T 7/251* (2017.01); *G06T 7/55* (2017.01); *G06T 15/205* (2013.01); *G06T 2200/16* (2013.01); *G06T 2207/10016* (2013.01); *G06T 2207/30196* (2013.01)

(58) Field of Classification Search
CPC . G06T 17/205; G06T 15/205; G06T 2200/16; G06T 17/20; G06T 19/00; G06T 17/00; G06T 17/10; G06T 17/005
See application file for complete search history.

(56) References Cited

U.S. PATENT DOCUMENTS

| | | | | |
|---|---|---|---|---|
| 6,483,519 B1* | 11/2002 | Long | ...................... | G06T 11/40 345/619 |
| 8,111,284 B1* | 2/2012 | Givon | ................... | G06K 9/3216 345/474 |
| 8,621,668 B1* | 1/2014 | Nolz | ....................... | A42B 5/00 2/171.4 |
| 9,177,220 B2* | 11/2015 | Givon | ................... | G06K 9/3216 |
| 9,466,109 B1* | 10/2016 | Adsumilli | ............ | H04N 5/2625 |
| 2004/0109595 A1* | 6/2004 | Luo | ........................... | G06K 9/38 382/132 |
| 2004/0210429 A1* | 10/2004 | Yu | ....................... | B29C 45/7693 703/9 |
| 2005/0063596 A1* | 3/2005 | Yomdin | .................... | G06T 9/00 382/232 |
| 2005/0213849 A1* | 9/2005 | Kreang-Arekul | ..... | G06T 3/4038 382/284 |
| 2007/0009041 A1* | 1/2007 | Wang | ................... | H04N 19/159 375/240.19 |
| 2007/0086622 A1 | 4/2007 | Sun et al. | | |

(Continued)

FOREIGN PATENT DOCUMENTS

EP    2 395 478 A1    12/2011

OTHER PUBLICATIONS

"Human body modeling with partial self occlusion from monocular camera", https//ieeexplore.ieee.org/document/4685478/, pp. 1-3 (2017).

(Continued)

*Primary Examiner* — Abderrahim Merouan
(74) *Attorney, Agent, or Firm* — Haverstock & Owens LLP

(57) ABSTRACT

A mesh tracking implementation for free-viewpoint video content utilizes part-based key frames which enables a more efficient and more accurate implementation of processing free-viewpoint video.

21 Claims, 11 Drawing Sheets

(56) References Cited

U.S. PATENT DOCUMENTS

| | | | | |
|---|---|---|---|---|
| 2007/0229498 | A1* | 10/2007 | Matusik | G06T 17/20 345/420 |
| 2008/0123968 | A1 | 5/2008 | Nevatia et al. | |
| 2008/0240588 | A1* | 10/2008 | Tsoupko-Sitnikov | G06K 9/4609 382/236 |
| 2011/0114803 | A1* | 5/2011 | Lee | A61G 13/101 248/70 |
| 2011/0164810 | A1* | 7/2011 | Zang | G06T 17/00 382/154 |
| 2011/0267344 | A1* | 11/2011 | Germann | G06K 9/00201 345/420 |
| 2011/0295363 | A1* | 12/2011 | Girard | A61F 2/2412 623/1.26 |
| 2013/0022262 | A1* | 1/2013 | Baele | G06K 9/00201 382/154 |
| 2013/0297058 | A1* | 11/2013 | Griffith | G06F 17/50 700/98 |
| 2015/0002510 | A1* | 1/2015 | Takayama | G06T 17/205 345/423 |
| 2015/0348319 | A1* | 12/2015 | Supikov | G06T 15/205 345/421 |
| 2016/0243699 | A1* | 8/2016 | Kim | B25J 9/1605 |
| 2016/0328876 | A1* | 11/2016 | Tong | G06T 13/40 |
| 2017/0006220 | A1* | 1/2017 | Adsumilli | H04N 5/23238 |
| 2017/0039750 | A1* | 2/2017 | Tong | G06T 13/40 |
| 2017/0046833 | A1* | 2/2017 | Lurie | G06T 19/20 |
| 2017/0337680 | A1* | 11/2017 | Weber | G06T 7/0012 |

OTHER PUBLICATIONS

Huang, Chun-Hao,"Human Shape and Pose Tracking Using Keyframes", IEEE Xplore 2014.

Huang Chun-Hao et al., "Human Shape and Pose Tracking Using Keyframes", 2014 IEEE Conference on Computer Vision and Pattern Recognition, IEEE, Jun. 23, 2014 (Jun. 23, 2014), pp. 3446-3453, XP032649315, DOI: 10.1109/CVPR.2014.440[retrieved on Sep. 24, 2014]abstract sections 3-6.

Zuffi Silvia et al., "The stitched puppet: A graphical model of 3D human shape and pose", 2015 IEEE Conference on Computer Vision and Pattern Recognition (SVPR), IEEE, Jun. 7, 2015 (Jun. 7, 2015), pp. 3537-3546, XP032793804, Doi: 10.11.06-CVPR.2015.7298976[retrieved on Oct. 14, 2015] abstract sections 1-5.

Tejera Margara et al., "Learning Part-Based Models for Animation from Surface Motion Capture", 2013 International Conference on 3D Vision, IEEE, Jun. 29, 2013 (Jun. 29, 2013), pp. 159-166, XP032480422, DOI: 10.1109/3DV.2013.29[retrieved on Sep. 13, 2013]abstract sections I, IV, Figures 1, 3, 4, 7.

Alvaro Collet et al.,"High-quality streamable free-viewpoint video", ACM Transactions on Graphics (TOG), vol. 34, No. 4, Jul. 27, 2015 (Jul. 27, 2015), pp. 69:1-69:13, XP055424381, US ISN: 0730-0301, DOI: 10.1145/2766945 abstract sections 3-7, figures 2, 3, 8, 9.

Mingsong Dou et al.,"Fusion4D", ACM Transactions on Graphics (TOG), ACM, US, vol. 35, No. 4, Jul. 11, 2016 (Jul. 11, 2016), pp. 1-13, XP058275854, ISSN: 0730-0301, DOI: 10.1145/2897824.2925969 abstract section 6.

International Search Report and Written Opinion of the International Searching Authority, dated Nov. 24, 2017, from PCT Application No. PCT/US2017/048142.

* cited by examiner

TSDF Fusion

Warped TSDF     Input TSDF     Fused TSDF

Mesh Bridge

ROBUST MESH TRACKING AND FUSION BY USING PART-BASED KEY FRAMES AND PRIORI MODEL

FIELD OF THE INVENTION

The present invention relates to three dimensional graphics. More specifically, the present invention relates to sparse view multi-view three dimensional graphics.

BACKGROUND OF THE INVENTION

Capturing a full 3D video containing real human performance has become one of the hot topics in the fields of computer vision and graphics. With a reconstructed geometry sequence, applications, e.g., free-viewpoint video (FVV), are recently developed to allow remote users to observe physically realistic motion and appearance at any viewpoint, and bring them an immersive experience when wearing virtual/augmented reality (VR/AR) hardware. The core technology behind this is to capture the performance with multi-view color cameras, single or multiple depth sensors, or their hybrid combination.

Performance capture in the past decade has been evolving from starting with template models or fully prescanned 3D actors and fitting them over time to the captured sequence, to reconstructing a 4D (spatio and temporal) geometry which evolves in real-time while capturing. The former restricts the capture to a particular scene with only the same template or actor, and the latter, referring to temporal fusion, which works with a general scene without any template prior, has attracted more attention from both academia and industry.

Although considerable efforts have been devoted to dynamic scene fusion (e.g., DynamicFusion, VolumeDeform, BayesianFusion, Fusion4D), the main focus is on improving the model quality and completeness in reconstruction. Since temporal registration of a large scene relies on a solution searched in an extraordinarily large space, the performance to capture is usually assumed to be slow motion and outlier free (e.g., multiple depth sensors and cameras). On the other hand, the registration error will still accumulate frame by frame to prevent tracking for a long time. After tracking a mesh successfully over dozens of frames, some triangles become overly deformed or topological changes occur, and the reference model needs to be reset. Therefore previous fusion methods prefer to a flexible way to store an independently reconstructed mesh for each time frame, which is simply disposed over time or cached leading to an unstructured sequence costing a huge amount of bandwidth or memory.

FVV is video which allows a user to change the viewpoint of the video at any time. For example, a user watching a sports video could change from watching the sports video from a perspective behind home plate to a perspective from the outfield. This enables users/viewers to view the content from a unique perspective.

SUMMARY OF THE INVENTION

A mesh tracking implementation for free-viewpoint video content utilizes part-based key frames which enables a more efficient and more accurate implementation of processing free-viewpoint video.

In one aspect, a method comprises segmenting an object in free viewpoint video content into parts, tracking the parts of the object, stitching the parts of the object and integrating the parts of the object to regenerate the object. The method comprises identifying a failure of tracking of a part. The method comprises implementing part-based keyframe refinement, whole mesh tracking and re-meshing the based on the parts of the object. Segmenting the object into the parts includes segmenting the object into body parts. Tracking the parts of the object includes storing position and location information of the parts. Stitching the parts of the object includes stitching a first part from a first time and a second part from a second time, wherein the first time and the second time are able to be different times. Integrating the parts of the object ensures that the parts of the object are blended together to present an appearance of a single object. The method further comprises acquiring the free viewpoint video content using at most 10 video cameras. The method further comprises acquiring the free viewpoint video content using video cameras with at least 30 degrees of separation on every axis from other cameras.

In another aspect, an apparatus comprises a non-transitory memory for storing an application, the application for: segmenting an object in free viewpoint video content into parts, tracking the parts of the object, stitching the parts of the object and integrating the parts of the object to regenerate the object and a processor coupled to the memory, the processor configured for processing the application. The application is further for identifying a failure of tracking of a part. The application is further for implementing part-based keyframe refinement, whole mesh tracking and re-meshing the based on the parts of the object. Segmenting the object into the parts includes segmenting the object into body parts. Tracking the parts of the object includes storing position and location information of the parts. Stitching the parts of the object includes stitching a first part from a first time and a second part from a second time, wherein the first time and the second time are able to be different times. Integrating the parts of the object ensures that the parts of the object are blended together to present an appearance of a single object. The apparatus is further for acquiring the free viewpoint video content using at most 10 video cameras. The apparatus is further for acquiring the free viewpoint video content using video cameras with at least 30 degrees of separation on every axis from other cameras.

In another aspect, a system comprises a plurality of camera devices each configured for capturing free viewpoint video content, a first computing device configured for: segmenting an object in free viewpoint video content into parts, tracking the parts of the object, stitching the parts of the object and integrating the parts of the object to regenerate the object and a second computing device configured for: rendering the free viewpoint video content on the second computing device. The first computing device is configured for identifying a failure of tracking of a part. The first computing device is configured for implementing part-based keyframe refinement, whole mesh tracking and re-meshing the based on the parts of the object. Segmenting the object into the parts includes segmenting the object into body parts. Tracking the parts of the object includes storing position and location information of the parts. Stitching the parts of the object includes stitching a first part from a first time and a second part from a second time, wherein the first time and the second time are able to be different times. Integrating the parts of the object ensures that the parts of the object are blended together to present an appearance of a single object. The plurality of camera devices include at most 10 video cameras. The plurality of camera devices include video cameras with at least 30 degrees of separation on every axis from other cameras.

DETAILED DESCRIPTION OF THE PREFERRED EMBODIMENT

Figure 1:
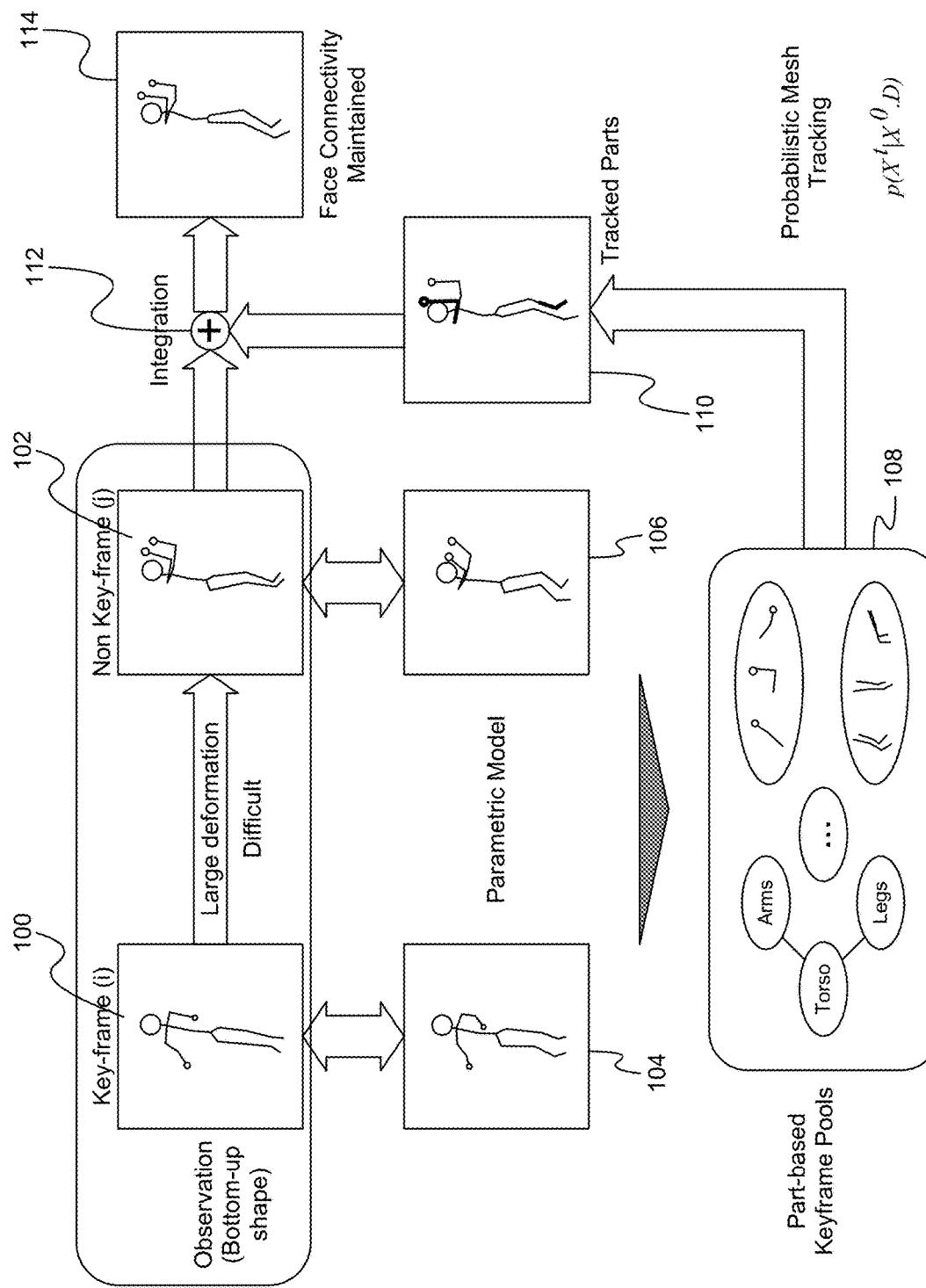
FIG. 1 illustrates a diagram of mesh temporal tracking according to some embodiments.

Dense view 3D video capture utilizes many cameras (e.g., 40-100+) to capture content from many different angles. More specifically, the spacing between the cameras may be very small (e.g., less than 5 degrees) between each camera. In dense view 3D video capture, processing is relatively simple compared with sparse view 3D video capture, since in sparse view there are issues that arise that do not appear during dense view 3D video capture. For example, occlusion is much more of a concern when using sparse view 3D video capture.

Sparse view 3D video capture uses far fewer cameras to capture content from many different angles. For example, sparse view 3D video capture may use 10 or fewer cameras for the same space that dense view 3D video capture uses 100 cameras. Put another way, the spacing (on at least one or every axis) between the cameras may be 45 degrees or even 90 degrees.

The mesh tracking method described herein (also referred to as a part-based mesh tracking method) increases the tracking robustness so that one reference mesh is able to be registered to a longer sequence with data noise and outliers; and when a reset happens, the refreshing cost that affects the overall data streaming and encoding is reduced.

To improve the tracking robustness, a part-based mesh tracking algorithm is utilized. The mesh tracking method assumes the human motion largely follows an articulated structure, and the whole body motion is able to be decomposed into local part translations and rotations. The segmentation reduces the optimization space and extends the range of pose fitting. The mesh tracking method does not assume an articulated motion prior, but only separates the whole scene into parts to reduce the dimensions of solution space, thus enabling more non-rigidity than an articulated motion. Moreover, since pure geometry-based nonrigid-ICP registration is prone to tangential drift and error accumulation, robust image features are used as anchor points to improve the tracking robustness to noise and outliers.

Next, to reduce the cost of data encoding when changing a keyframe, a part-based local re-mesh algorithm is utilized. Inter-frame mesh coding uses the same face connectivity over consecutive frames while vertices deform. If the mesh connectivity of the reference/key frame is updated, the overall encoding has to be reset leading to increasing the cost of memory and bandwidth. The part-based re-mesh approach also allows locally modifying the keyframe so that the shared vertices and connectivity are able to still be encoded efficiently.

The mesh tracking method includes: a part-based tracking algorithm to robustly track meshes in a long sequence with noise, topology change and data missing; a two-pass fusion framework to both improve shape quality and maintain mesh connectivity; and a part-based local re-mesh algorithm to reduce the cost of keyframe reset.

Most mesh deformation techniques compute the mesh warping field based on the embedded deformation (ED). This method provides an efficient way to represent non-rigid mesh deformation by associating near rigid transformations on predefined or sampled graph nodes. Variants in mesh tracking are designed later to deal with natural over-smoothed distortion, e.g., using L0 regularization and topology evolving.

Streamable FVV starts from dense camera and high quality data capture and defines the keyframe to track based on the statistics of surface and topology. By tracking over dozens of frames, this approach allows inter-frame mesh encoding and greatly reduces the cost of bandwidth. The method optimizes the re-meshing of keyframe and the parameterization of texture atlas in a longer sequence with topology change.

Performance capture animates the pre-built model to the captured sequence based on either ED or skinning system (LBS) where the scene is controlled and outlier-free. Robust LBS-based approaches use keyframes by pose analysis to better constrain human tracking in data missing and outliers.

Another implementation focuses on human body parametric model, e.g., SMPL to estimate the human pose and shape from depth and image sequence, or even under complicated clothed shapes. When applying full body human models to fitting a scene of large pose change, the solution is usually ambiguous and incorrect. To explore the space of poses more effectively, the Stitched Puppet (SP) method uses a distributed representation, in which each part is able to undergo a rigid transformation in 3D, to facilitate inference.

The part-based tracking approach described herein models each part undergoing a non-rigid deformation to increase the robustness. To differentiate from other patch-based approaches, which partitions a whole mesh by geometrically sampling and associates each patch with a rigid transformation, each part in the tracking described herein has a meaningful independent motion in the sequence.

Temporal fusion is based on the mesh tracking technique but focuses more on refining shape quality and temporal smoothness without maintaining mesh connectivity. Most fusion approaches take a sequence of frames in order, either single or multiple views, "de-posing" each input by registering to a common coordinate frame and fusing them into a so-called canonical mesh.

Mesh completion from a single-view RGBD sensor provides a low-cost way to obtain a detailed scan and attracts many research interests. Non-rigid and dynamic fusion approaches have been developed to incrementally fuse per-frame partial depth in real-time into a complete 3D model. The motion of the target model, although nonrigid, is assumed nearly static or slow. Recent approaches utilize image feature correspondences or shading to enhance the fusion robustness in a faster motion and topology change, e.g., collision case.

With a multi-view setup combining depth sensors and cameras, 4D reconstruction techniques, e.g., free-viewpoint video and holoportation are introduced and enable realistic user experience in VR/AR. A latest version, Fusion4D, allows per-frame mesh tracking and volumetric fusion to improve geometrical quality but not to maintain the connectivity as FVV. Besides the most widely used volumetric fusion of Truncated Signed Distance Function (TSDF), other volumetric approaches, e.g., probabilistic volumetric models and Bayesian fusion on occupancy grid are developed to enhance subtle details. For simplicity, in some embodiments, the mesh tracking method uses the standard TSDF as the volumetric fusion technique.

In the mesh tracking method, image-based deep Convolutional Neural Network (CNN) approaches are utilized, particularly to detect semantic parts from 2D images. For image-based feature correspondence, Fusion4D uses a random forest-based sparse image feature, the global patch collider; however, the state-of-the-art CNN-based optical flow FlowNet2.0 is used in the mesh tracking method, in some embodiments, which is able to provide more accurate and denser correspondences.

In some embodiments, the mesh temporal tracking method takes a 3D model sequence form a sparse-view setup as input and generates a temporally consistent mesh sequence, which has the same topology and the same face connectivity with improved model quality including less noise and suppressed outliers.

The input model sequence contains human models and other objects. The mesh temporal tracking method estimates the shape and pose of the human model using a prior trained human prior model and segments the scene into human body parts and other objects (each object is treated as an independent part) for each frame. The mesh temporal tracking method builds a keyframe pool for each part based on a keyframe tracking approach and tracks each selected keyframe from each keyframe pool. After tracking, the mesh temporal tracking method refines each part based on volumetric fusion and reconstructs the whole scene by integrating all parts together and maintains the face connectivity if all of the keyframes of parts are the same.

There are multiple implementations of the mesh tracking method described herein. Aspects of the implementations are able to function independently and/or are able to be utilized together such as by interchanging one or more aspects between each implementation.

FIG. 1 illustrates a diagram of mesh temporal tracking according to some embodiments. FVV content includes frames such as key frames and non-key frames. Key frames 100 are frames in a 3D video where an object is clear versus non-key frames 102 where the object is cluttered. For example, a frame (e.g., a specific time in a video) where a person's arms and legs are extended out or up/down, is a key frame 100. When a person's arms or legs are close to their body, that is a non-key frame 102. In other words, key frames 100 have minimal occlusion compared with non-key frames 102 which may have some occlusion. The key frame 100 is able to be used as a template for analysis. Since extended arms/legs provide a clearer picture for analysis than a compacted body, the key frames 100 are better for analysis to extract information and manipulate the information. Sometimes there is a large deformation from a key frame 100 to a non-key frame 102, meaning the it is difficult to determine the correspondence between the key frame 100 and the non-key frame 102.

The key frames 100 are able to be determined in any manner, such as automatically using image matching (e.g., comparing a shape with templates to determine which frames are key frames), manually selecting key frames, and/or any other way of determining the key frames 100. Further, the key frames 100 are only select frames for optimization such that less information is processed. Although each frame of a video could be processed separately, by utilizing key frames 100, fewer computations are utilized. In some embodiments, the video is pre-captured video (e.g., acquired via download), and in some embodiments, the video is captured using camera devices. Regardless of how the video is captured, key frames 100 are located within the video without the user posing in specified poses. For example, a video is captured using a sparse view 3D camera setup with a person jumping, and based on that video, key frames 100 are located/detected and used.

Since determining the correspondence or deformation from a key frame to a non-key frame may be difficult, prior information (e.g., pose and/or segmentation) is utilized to assist with the process. The prior information is able to include part-based keyframe pools 104.

From the key frames 100 and the non-key frames 102, parametric models are able to be used or determined/generated. For example, parametric models are determined by matching a key-frame 100 or a non-key frame 102 with parametric models stored in a data structure (e.g., database) and the closest match is used as the parametric model, such that there is a key frame parametric model 104 and a non-key frame parametric model 106.

By separating the parametric models 104, 106 into parts, part-based key frame pools 108 are able to be generated/used. The parts are able to be separated/extracted in any manner such as by determining what a specific part is and excluding the remainder of the model or extracting only the specific part. Specific parts are able to be identified/determined (e.g., pose segmentation) in any manner such as by comparing the part with a database parts, and the part is identified as the closest match in the database. For example, a head is compared with head, arm, leg, and torso shapes stored in a database, and using any matching algorithm (e.g., comparing number of pixels, shape, contours), the head is determined to match the head shape and is identified accordingly. In some embodiments, the part-based keyframe pools 108 have a hierarchical/connective structure (e.g., since arms attach to the torso on a human body, the structure includes a connection between the torso and the arms, but the arms do not connect to the legs in the structure, since they do not connect on a human body). The hierarchical/connective structure is able to be used in the fusion and/or integration process to reassemble the object.

The parts in the part-based keyframe pools 108 are tracked using any tracking implementation such as probabilistic mesh tracking. Thus, the parts being tracked are tracked parts 110. Tracking parts is able to include recording the type of part, position information regarding the parts, temporal information of the parts, and/or any other information.

The tracked parts 110 are integrated 112 together with the appropriate key-frame and/or non-key frame information to generate the assembled shape 114 in the FVV content.

Figure 2:
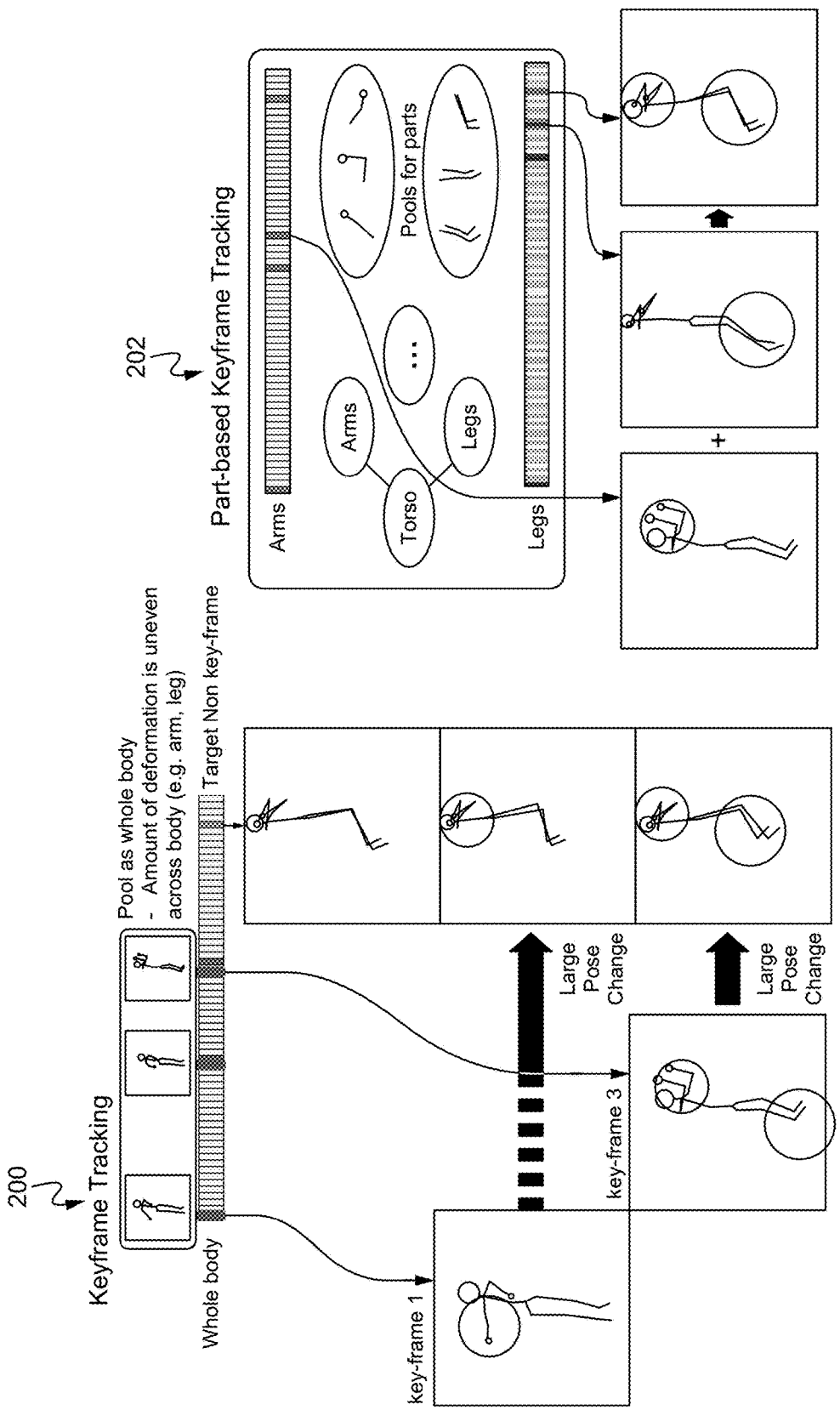
FIG. 2 illustrates key frame tracking and part-based key frame tracking according to some embodiments.

FIG. 2 illustrates key frame tracking and part-based key frame tracking according to some embodiments. Key frame tracking 200 uses a pool of the whole body (e.g., not separated into separate parts), and the amount of deformation is uneven across the body. Particularly, as shown in FIG. 2, there are artifacts when key-frame 1 is used for target non-key frame, where there is a large pose change. Similarly, there is a large artifact when key-frame 3 is used for the target non-key frame.

Part-based key frame tracking 202 uses smaller local (semantic) deformation for better quality. As shown, the arms from a specific point in time are integrated with legs from a different point in time to generate an assembled shape in the FVV content. For example, as shown, there are many different time segments and parts (e.g., arms and legs) corresponding to each time segment. The arms are selected from a first point in time, and the legs are selected from a second point in time, and those selected parts are fused and/or integrated to show a shape at a third point in time. Determining which point in time to select a part is able to be implemented in any manner such as locating a part that closely matches the target non-key frame (pose) and/or locating a part with minimal or no artifacts. Finding parts with minimal or no artifacts is able to be implemented in any manner such as using image processing mechanisms to locate artifacts and avoiding frames with those artifacts.

Figure 3:
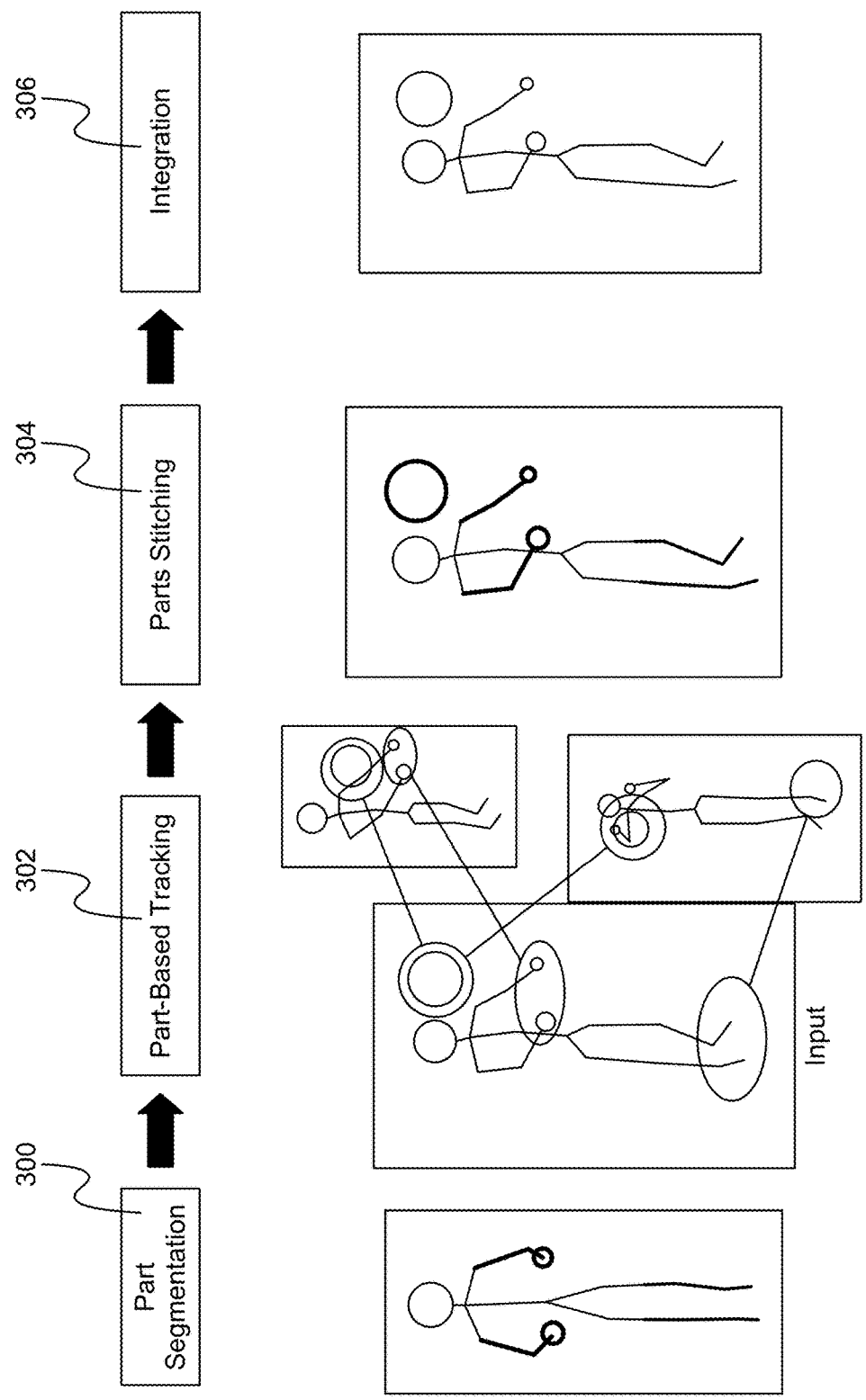
FIG. 3 illustrates a diagram of whole body integration according to some embodiments.

FIG. 3 illustrates a diagram of the whole body integration according to some embodiments. In the step 300, part segmentation is implemented. As described herein, body part segmentation is able to be implemented in any manner such as by determining edges and distinct components/parts using image processing techniques or by comparing body parts with stored body part templates and classifying the body parts based on matches.

In the step 302, parts are tracked. The body parts are able to be tracked in any manner such as by locating specific body parts through image processing and/or matching and storing location/position information regarding each specific body part.

In the step 304, parts are stitched or fused. For example, parts from different points in time are stitched or fused together to construct a target shape possibly at a different point in time. Furthering the example, if an arm is partially occluded or would cause another artifact, then the arm at a different time is utilized. In some embodiments, Fusion4D is utilized to stitch or fuse the parts together.

In the step 306, the parts are integrated together to form a single shape. The fusion of step 304 puts the parts together, and the integration forms a single shape (e.g., no seams or separation of parts).

In some embodiments, fewer or additional steps are implemented. For example, additional steps of acquiring (e.g., capturing with cameras) FVV content, texture processing, rendering/displaying of the FVV content, and/or any other FVV content processing steps are implemented. In some embodiments, the order of the steps is modified.

Figure 4:
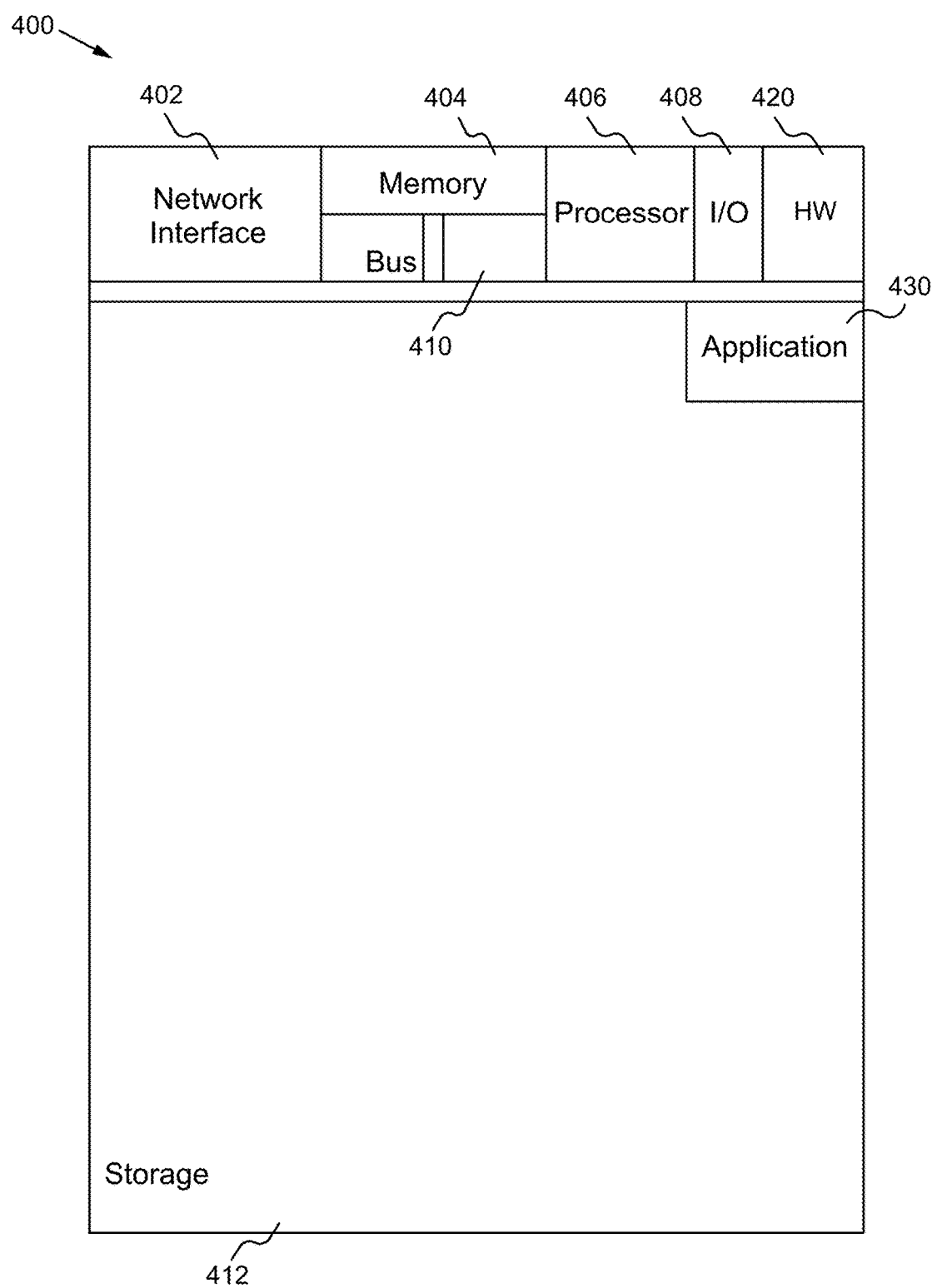
FIG. 4 illustrates a block diagram of an exemplary computing device configured to implement mesh tracking according to some embodiments.

FIG. 4 illustrates a block diagram of an exemplary computing device configured to implement mesh tracking according to some embodiments. The computing device 400 is able to be used to acquire, store, compute, process, communicate and/or display information such as images and videos. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Mesh tracking application(s) 430 used to implement the mesh tracking are likely to be stored in the storage device 412 and memory 404 and processed as applications are typically processed. More or fewer components shown in FIG. 4 are able to be included in the computing device 400. In some embodiments, mesh tracking hardware 420 is included. Although the computing device 400 in FIG. 4 includes applications 430 and hardware 420 for the mesh tracking, the mesh tracking is able to be implemented on a computing device in hardware, firmware, software or any combination thereof. For example, in some embodiments, the mesh tracking applications 430 are programmed in a memory and executed using a processor. In another example, in some embodiments, the mesh tracking hardware 420 is programmed hardware logic including gates specifically designed to implement the mesh tracking.

In some embodiments, the mesh tracking application(s) 430 include several applications and/or modules. In some embodiments, modules include one or more sub-modules as well. In some embodiments, fewer or additional modules are able to be included.

In some embodiments, the mesh tracking hardware 420 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch) or any other suitable computing device.

Figure 5:
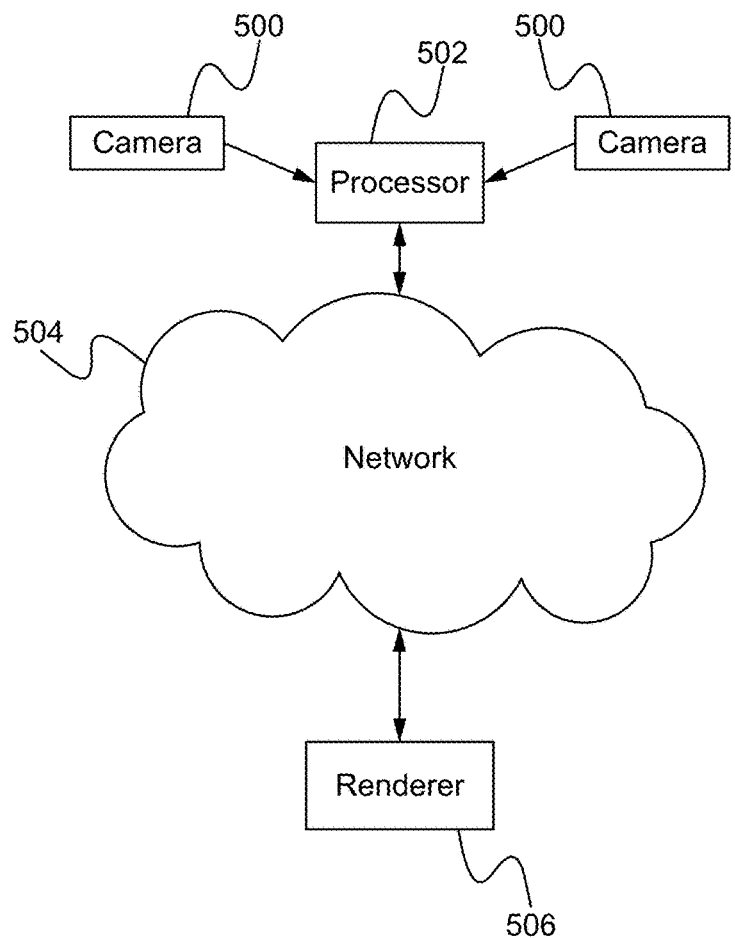
FIG. 5 illustrates a diagram of a network of devices according to some embodiments.

FIG. 5 illustrates a diagram of a network of devices according to some embodiments. A plurality of cameras 500 are utilized to acquire 3D/FVV video content. The video content is processed by one or more processor devices 502 which implement the mesh tracking as described herein. The processed content is transmitted through a network 504 (e.g., the Internet, a cellular network or any other network) to one or more render/display devices 506. In some embodiments, the content is transmitted to the one or more render/display devices 506 directly without a network. The devices of the one or more network of devices are configured to perform the mesh tracking described herein. The one or more processor devices 502 and the one or more render/display devices 506 are able to be any device such as servers, a personal computers, smart phones, televisions, gaming systems, virtual reality devices or any of the devices described herein or any combination of devices described herein. In some embodiments, the camera(s) 500 implement additional aspects of the mesh tracking.

In some embodiments, the mesh tracking method runs in a frame-by-frame manner to process a mesh sequence and outputs a refined and tracked mesh sequence.

Figure 6:
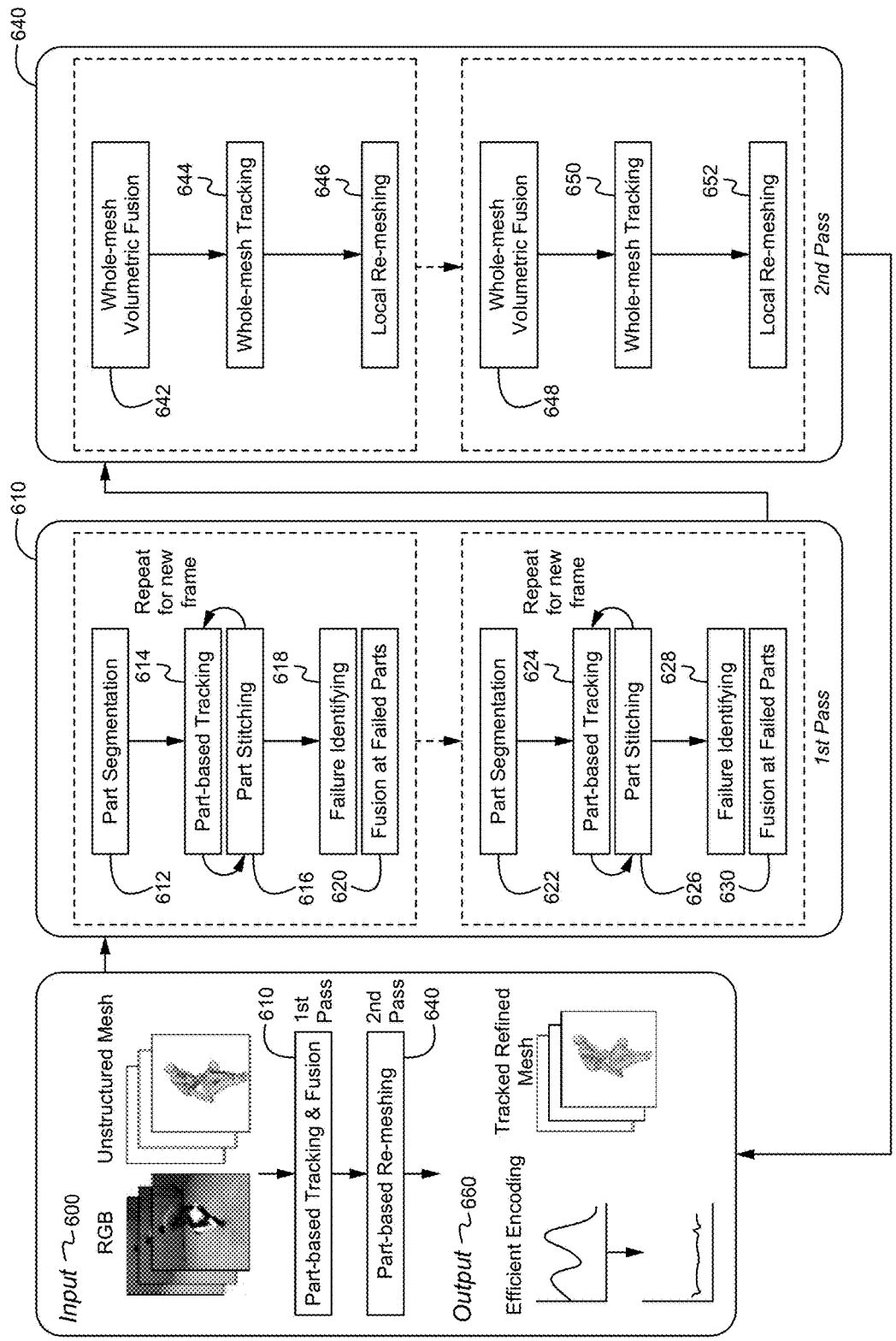
FIG. 6 illustrates the pipeline of a framework of mesh tracking, fusion and keyframe resetting according to some embodiments.

FIG. 6 illustrates the pipeline of a framework of mesh tracking, fusion and keyframe resetting according to some embodiments. Keyframes are automatically identified in the sequence. Between two keyframes, the method runs in two passes: in the first pass, tracking is implemented using the part-based algorithm, and then the stockpiled meshes are used to refine the shape of keyframe locally and track it again as the final result in a second pass.

The framework includes receiving/acquiring/using input 600 such as RGB images and unstructured mesh information. The first pass 610 includes part-based tracking and fusion, and the second pass 640 includes part-based re-meshing, which results in an output 660 of a tracked, refined mesh and/or other information.

In the beginning of the first pass, in the step 612, the method automatically segments the whole input/keyframe mesh into semantic parts. In the step 614, each part is then tracked independently with an adaptive regularization weight defined in the embedded deformation. In the step 616, an efficient algorithm stitches up all the parts to a whole mesh after tracking each frame. If there is a failure in identifying a part in the step 618 or a failure at fusing parts in the step 620, then the process repeats including: part segmentation in the step 622, part-based tracking 624, part stitching 626, identifying part failures 628 and identifying failed fusion 630. The repeated process utilizes successfully tracked parts and failed parts from the input as a new keyframe, and the sequence is continued to be tracked. Once the first past is finished, keyframes are identified.

In some embodiments, after the first pass, the process moves to the second pass which involves whole-mesh volumetric fusion 642, whole-mesh tracking 644, and local re-meshing 646, which may be repeated one or more times as whole-mesh volumetric fusion 648, whole-mesh tracking 650 and local re-meshing 652.

In some embodiments, once the tracking process reaches the end of the sequence or a tracking failure of any part is identified, e.g., at frame T, the system runs a keyframe update. First, a new locally re-meshed keyframe is extracted using TSDF blending at the previous keyframe, and then it tracks again in a second pass using the correspondence of each tracked mesh, and provides the output sequence t=1; 2, . . . , T−1. Second, the input mesh at frame t=T is locally stitched to successfully tracked parts to construct a new keyframe and make a temporally smooth transition. Also the new keyframe has a locally updated vertex set and triangle connectivity only in the failed region but shares with the other successfully tracked set. The whole pipeline repeats for the new incoming sequence using the new keyframe to start with.

In some embodiments, fewer or additional steps are implemented. In some embodiments, the order of the steps is implemented. Additional details regarding the mesh tracking method are described further herein.

The approach is a mesh tracking framework to maintain the mesh connectivity, so it is different from the temporal fusion method, e.g., Fusion4D, in which each input frame is tracked only one frame away and the output mesh connectivity changes per frame. Also the approach is different from existing mesh tracking approach as the quality of the output sequence will be refined with temporal fusion, and the goal of part-based tracking improves the robustness for a long sequence with noise, topology change and data missing.

A part-based mesh tracking algorithm (also referred to as the mesh tracking method) is described herein, given the fact that when tracking the mesh as a whole, a common failure case is able to happen if a small nonrigid region is misaligned (e.g., elbow), the other well-tracked adjacent part whose motion is greatly determined by that (e.g., forearm) is then ruined and begins to lose track. In the method, the whole mesh is segmented into parts first, parts are tracked independently and stitched again after tracking one frame. Specifically, a pre-trained human body segmentation is used while keeping it general to any free-form mesh deformation by extending the segmentation. Described herein, the method tracks a keyframe from frame t−1 to frame t.

Given the input mesh and its 2D rgb images as the keyframe, a semantic segmentation is initialized on the mesh. A multi-person pose estimation method is used to detect persons and body parts on the rgb image of each available view. The pre-trained CNN-based detection provides confidence maps called Part Affinity Fields (PAF) for each person's bone in both positive and negative directions in the skeletal tree. An average of the absolute values of both positive and negative maps is taken to generate a confidence map, Score2D$_{b,i}$, for each bone b of each person and for each image at view i. A CNN-based method is used for its robustness to estimate even occluded bones in the image, also instead of directly using the articulated skeleton prior, the whole mesh is partitioned into parts.

To infer the confidence Score3D$_b$(x) of an arbitrary 3D point x of bone b, the mesh is projected to a 2D image of view i to sum up all the 2D confidence within the projected silhouette, denoted as TotalScore$_{b,i}$. The confidence of x at view i is directly accessed from the confidence map at its 2D projected location as Score2D$_{b,i}$(x). The multi-view scores are combined using a weighted mean, $$Score3D_b(x) = \frac{\sum_i Score2D_{b,i}(x) \cdot TotalScore_{b,i}}{\sum_i TotalScore_{b,i}}. \quad (1)$$

Figure 7:
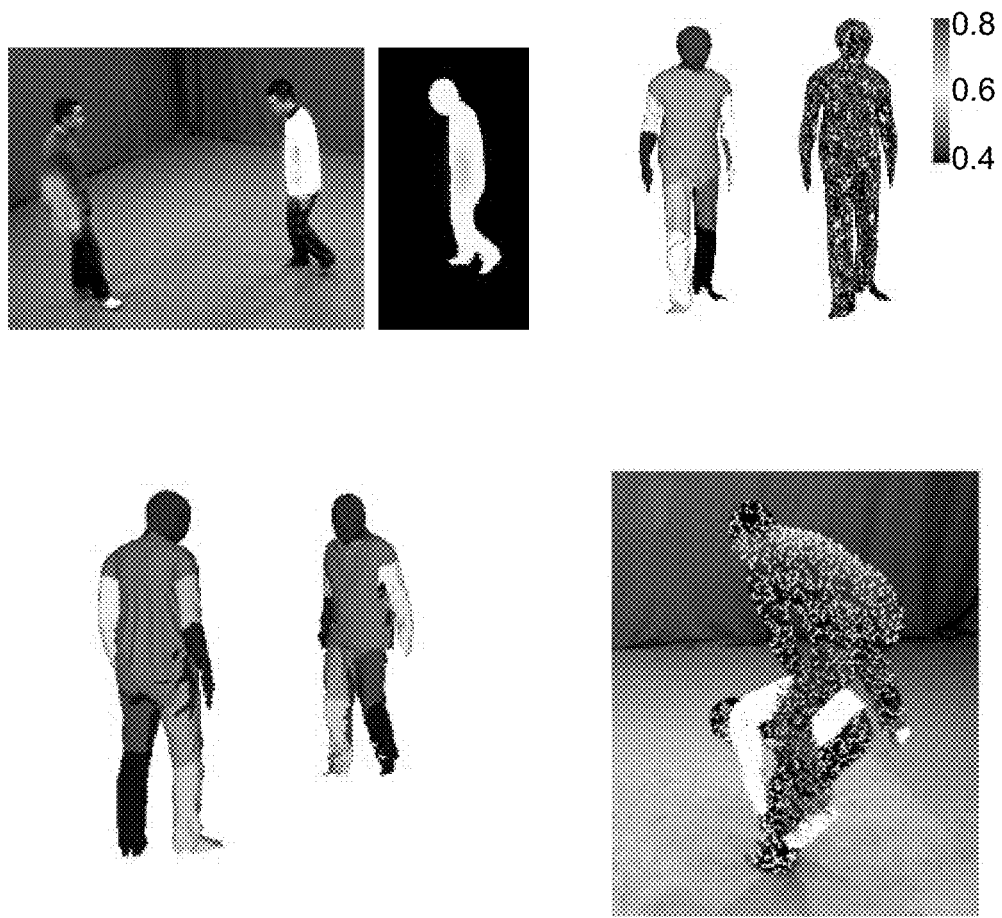
FIG. 7 illustrates an example of Score3Db(x) on the mesh set according to some embodiments.

An example of Score3D$_b$(x) on the mesh set according to some embodiments is shown in FIG. 7. For each person, the mesh is segmented into a graph containing p parts, e.g., p=1, . . . , 10. For the confidence of each body part, e.g., body trunk, all the scores of bones belong to it are summed up. By normalizing Score3D$_b$(x) to make them add to 1, a skinning weight S of each vertex is obtained, which is later used to define regularization in solving the tracking problem.

In FIG. 7, the upper left shows Score2D detected for two persons and TotalScore computed in one silhouette of multiple views. If a body part (e.g., right forearm) is occluded, the TotalScore still contributes a small weight to compute Score3D. The segmentation for all the persons in the scene is shown in the lower left. The ED graph and the regularization weight defined jointly by both node distance and the skinning weight are shown in the upper right. The lower right shows an anchor feature point correspondence detected in one view with only 5% randomly downsampled points plotted.

Also, a hard segmentation is performed based on the 3D confidence score that is able to be further used in the stitching. First of all, the vertex to a part is labeled if its Score3D is greater than a percentage threshold of that part. The label is then propagated over the mesh to construct a segmentation as shown in FIG. 7. The vertex index sets of parts are denoted as Γ(p). Besides, the part propagation is continued to dilate each part to Γ'(p) so that each pair of neighboring parts has an overlapping region of 5 cm width (or other value). The distance is measured as the geodesic distance on the whole mesh. In addition to persons detected in a scene, other nonhuman objects are divided by their mesh-connected components.

The tracking of each body part is formulated based on embedded deformation (ED) and extended by considering the weight of each part. Uniformly sampled seeds (average sampling distance σ) from the vertex set of the keyframe are defined as ED graph nodes g of the whole mesh, and they are partitioned to each hard segmented part described herein. The ED to solve is associated independently on the nodes of each part.

The ED model defines a deformation of a vertex $v_m$ which undergoes a "skinned" interpolation to the transformation of its closest ED nodes $g_k$:

$$\tilde{v}_m = R \sum_k w_k^m [A_k(v_m - g_k) + g_k + t_k] + T, \quad (2)$$

where the list of affine transformations $A_k$, translations $t_k$ and a global rigid $[R,T]$ constructs the ED parameter to solve. The skinning weights are computed once and fixed at the keyframe as $$w_k^m = \frac{1}{Z} \exp(-2\|v_m - g_k\|^2 / \sigma^2),$$

where Z normalizes the skinning weight to add to 1 and σ is the average seed sampling distance.

The total tracking objective function of a body part from frame t−1 to t is:

$$E_{ed} = E_{reg} + \lambda_d E_{data} + \lambda_c E_{corr} + \lambda_{vh} E_{vh}. \quad (3)$$

The embedded graph regularization contains $$E_{reg} = \lambda_r E_{rot} + \lambda_s E_s, \quad (4)$$

where, $$E_{rot} = \sum_{i=1}^{N} \|A_i^T A_i - I\|_F^2 + (\det(A_i) - 1)^2, \quad (5)$$

restricts the deformation to rigid but not too stiff to be numerically unstable, and the smoothness term is defined as $$E_s = \sum_{i=1}^{N} \sum_{j \in N(i)} \psi_s(i,j) \|(A_j - I)(g_i - g_j) + t_j - t_i\|^2. \quad (6)$$

To model the deformation between two body parts naturally, the regularization weight between adjacent nodes $(g_i, g_j)$ is defined as $$\psi_s(i,j) = \exp(-\|g_i - g_j\|^2 / 2\sigma_g^2) \cdot \exp(-\|S_i - S_j\|^2 / 2\sigma_s^2) \quad (7)$$

where S is the per-vertex park skinning weight defined in the mesh segmentation step, and $\sigma_g$, $\sigma_s$ denote the average distance of nodes and Mean(2∥Si−Sj∥) respectively.

Figure 10:
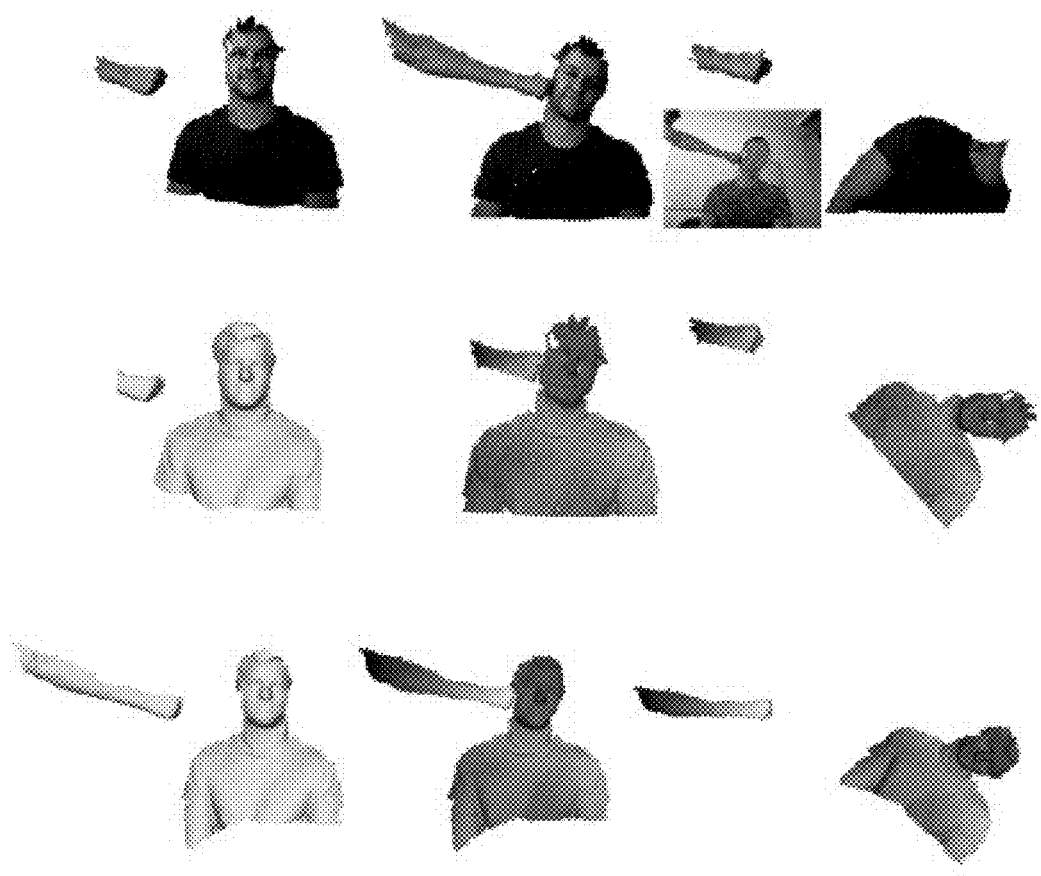
FIGS. 10 and 11 illustrate results utilizing the mesh tracking method according to some embodiments.
Figure 11:
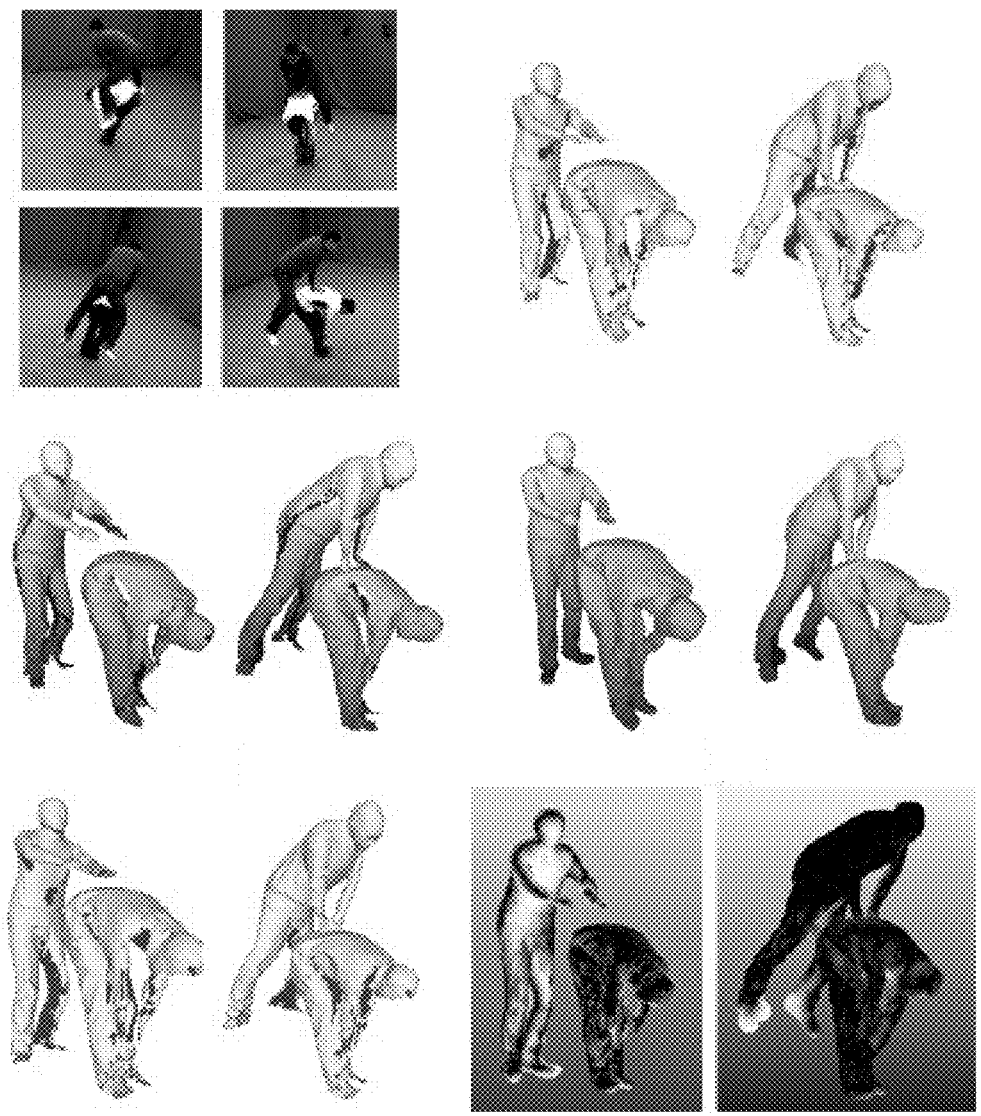

The data term searches the corresponding set $C^{vd}_{data} = \{c_1, c_2\}$ along each view direction v from a source vertex $\tilde{v}_{c_3}$ to a target intersecting point $u_{c_2}$ on the input mesh:

$$E_{data} = \sum_{(c_1, c_2) \in Prune(\bigcup_v C^v_{data})} |\tilde{n}_{c_1} \cdot (\tilde{v}_{c_1} - u_{c_2})|^2, \quad (8)$$

where $\tilde{n}_{c_3}$ indicates the normal $\tilde{v}_{c_3}$ and the union operation $\bigcup_v$ stacks the correspondence of all the views. In practice, since $\tilde{n}_{c_3}$ involves the inverse of matrices leading to unfeasible explicit calculation, it is fixed to the result of previous iteration to simplify the calculations of derivatives. An error pruning function Prune is used to exclude the incorrect correspondences:

$$Prune(C) = \{(c_1, c_2) | \tilde{v}_{c_3} - u_{c_2} \le d, angle(\tilde{n}_{c_1}, n(u_{c_2})) \le \beta\} \quad (9)$$

in which a distance threshold d=10 cm and β=60° is set in the example case in FIG. 10 and FIG. 11.

Purely ICP-based or Gaussian-based geometric registration is prone to tangential drift and error accumulation, and this issue becomes worse in the presence of noise and outliers. In order to track a long sequence with large motion, anchor points are required to constrain the error accumulation. CNN-based optical flow FlowNet2.0 is adapted as feature clue. At the beginning of tracking, the feature corresponding set $C^v_{corr} = \{c_1, c_2\}$ is computed once by projecting the aligned mesh at t−1, $\tilde{v}_{c_3}$ to view v, accessing the optical flow from t−1 to t, and back-projecting to the input mesh at t. And the term is $$E_{corr} = \sum_{(c_1, c_2) \in Prune(\bigcup_v C^v_{corr})} |\rho(\tilde{v}_{c_1} - u_{c_2})|, \quad (10)$$

in which a Huber function ρ(•) is used with a threshold of 0.01 as robustifier.

The visual hull term and its derivative is defined in the distance function H, which takes the absolute value of TSDF.

$$E_{vh} = \sum_{m=1}^{M} H(\tilde{v}_m)^2, \quad J(H(\tilde{v}_m)) = \nabla H(\tilde{v}_m) J(\tilde{v}_m). \quad (11)$$

The gradient ∇H is approximately in a $3^3$ window.

The optimization starts with solving global rigid [R, T] transformation by fixing all the other parameters and then follows an LM solver. In solving the normal equation, the blocks of $J^T J$ and $J^T f$ are directly constructed on a GPU per-iteration and the kernel-merged PCG is run as a linear solver. LM solver stops when the error function converges or reaches a maximum iteration of 10.

Stitching assembles independently tracked body parts into a whole mesh is related to the stitched puppet human modeling technique. By defining an overlapping area between two parts in previous segmentation step, each vertex is able to be modeled as a linear spring connecting two corresponding ends in each part and having a rest length of 0. The stretch force of springs drag two parts together and also eliminate their inter penetrations.

The independent ED of a part p solved above is denoted as $ED_p$ with nodes parameter $G_p$, the whole mesh ED as $ED_{all}$ with parameter G, so that $G_p \subset G$. The stitching objective function is defined over whole mesh parameter G:

$$E_{stitch} = E_{ed} + \lambda_f E_{fit} + \lambda_s E_{spring}, \quad (12)$$

where the ED regularization term $E_{ed}$ is the same as Equation 4, and the data fitting term describes the deformed whole mesh should match each independent tracked part:

$$E_{fit} = \sum_p \sum_{i \in \Gamma(p)} \alpha_p(x_i) \|ED_{all}(x_i, G) - ED_p(x_i, G_p)\|^2 \quad (13)$$

where $\Gamma(p)$ is the vertex index subset of a part p, and $\alpha_p(x_i)$ is an adaptive weight inverse proportional to the geometric distance to a part's boundary.

The stitching energy $E_{spring}$ is used to minimize the potential generated by the springs:

$$E_{spring} = \sum_{p,q} \frac{\sum_{i \in \Gamma'(p) \cap \Gamma'(q)} \|ED_p(x_i, G) - ED_q(x_i, G)\|^2}{|\Gamma'(p) \cap \Gamma'(q)|}, \quad (14)$$

where $\Gamma'(p) \cap \Gamma'(q)$ is the vertex index set of the overlapping region between two adjacent extended parts p, q and $ED_p(x_i, G)$, $ED_q(x_i, G)$ are computed on the corresponding subsets of ED nodes.

Minimizing the objective function Equation 12 is similar to the process of tracking and ends up with solving the parameter G. That is followed with another whole mesh tracking by optimizing Equation 3 initialized with G and output the tracked whole mesh at frame t.

Mesh 4D integration involves optimizing the keyframe and the tracked mesh structure in a general sequence. When a keyframe is not able to represent the object to track any more, the keyframe is updated. Existing FVV methods update keyframes either globally or locally to make the output consistent with whatever input. If the sequence contains outliers and data missing, these approaches update keyframes frequently and result in a flickering output. The goal is to build and refine a keyframe from the noisy input. Therefore, a different strategy is used to identify the tracking failure and optimize keyframes in a part-based manner.

A keyframe is identified once the part-based mesh tracking fails. After stitching the tracked parts, the extracted ICP correspondence set $C^{vd}_{ata}$ in Equation 8 is re-evaluated for all the views using the same error pruning criterion. If the misalignment condition $\varepsilon = \cup_v C^v_{data} - Prune(\cup_v C^v_{data}) \neq \emptyset$ holds, a failure of tracking is identified. The overall RMS error and the geodesic error on the target mesh are not measured since these errors are able to be large in the case that the target mesh and the keyframe mesh have significant topology difference. The misalignment condition matches the observation that if data missing or topology change happens, the keyframe keeps tracking until meeting another frame with a large registration error.

Figure 8:
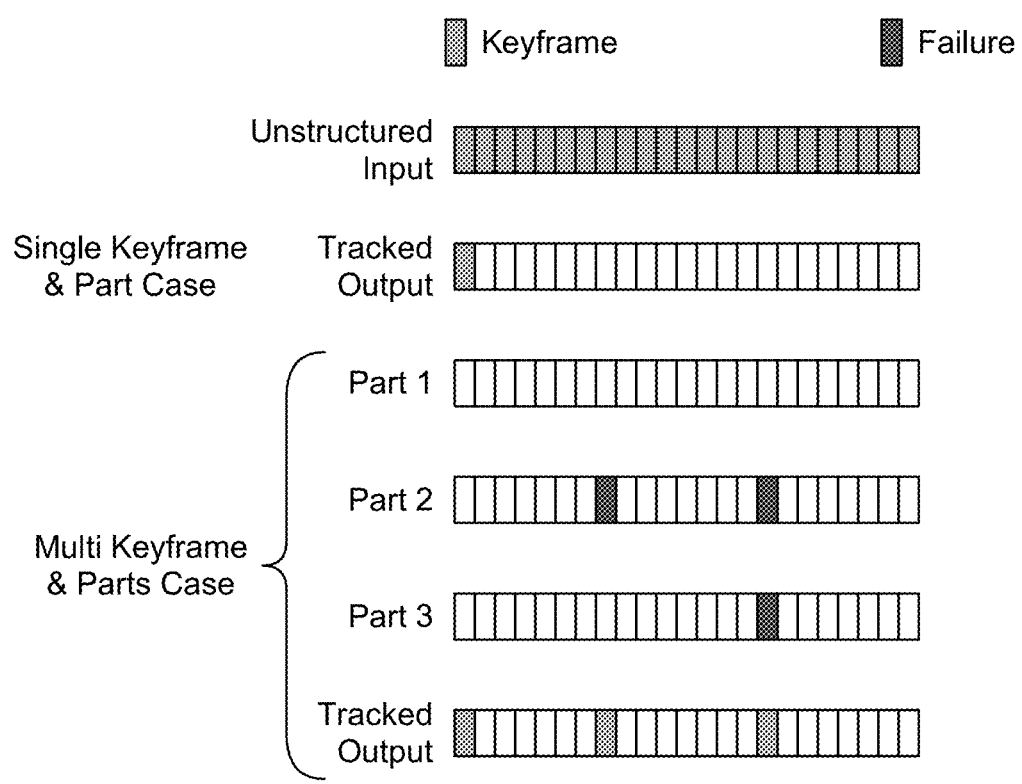
FIG. 8 illustrates examples of two-pass modeling pipelines for the case of a single keyframe and a whole mesh and the case of multiple keyframes and parts local re-mesh according to some embodiments.

Given that the input sequence contains outliers and missing data, when a failure is identified, the whole tracking is not reset except for failed parts, but processing the successfully tracked parts continues. First of all, the approach maintains the canonical TSDF and defines the warping of a TSDF based on the 1st-order volumetric interpolation. A part-based TSDF fusion operation is defined as the following:

$$F(\mathcal{I}, ED^r, \mathcal{L}, P), \quad (15)$$

to denote the blending all the input TSDFs $\mathcal{I}$ near a set of parts P to the canonical frame r using the ED graph $ED^r$ and warp the fused canonical TSDF to frames in a lifespan $\mathcal{L}$. For example, if the first frame is able to be used to track the whole sequence as one part (the simplest case in FIG. 8), the resulting TSDF sequence will be $F(\{I^1, \ldots, I^{T_E}\}, ED^1, \{1, \ldots, T_E\}, 1)$.

Figure 9:
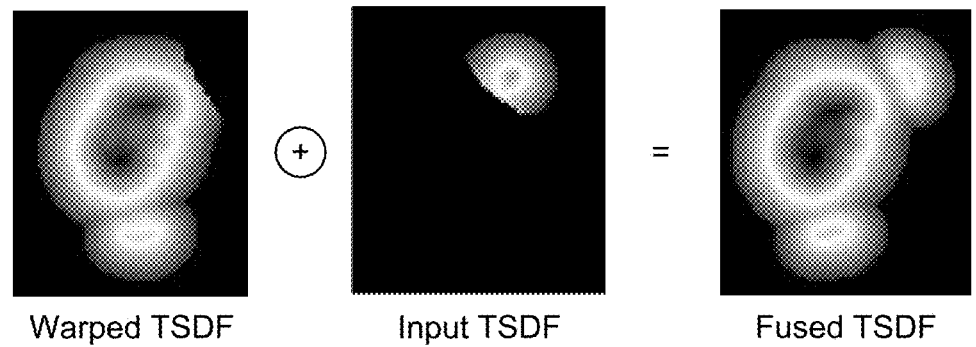
FIG. 9 illustrates a seamless mesh bridge according to some embodiments.
Figure 9:
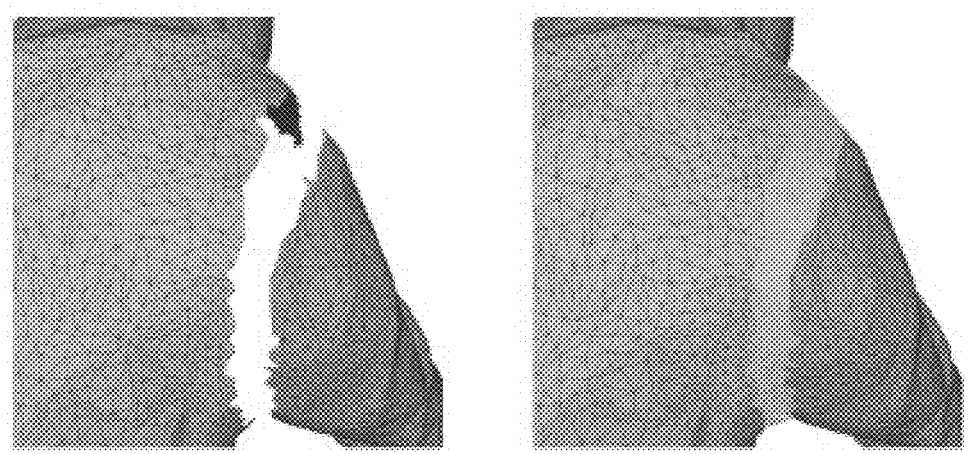

If a misalignment is identified given $\varepsilon$, the failed part is detected by checking the condition $\varepsilon \cap \Gamma(p) \neq \emptyset$, and the mesh and TSDF of this keyframe are updated using a partbased strategy. For example, in the multi-keyframe case in FIG. 8, if tracking part 2 fails at frame $T_1$ while part 1 and 3 succeed, the TSDF sequence of frame $1, \ldots, T_1-1$ as $F(\{I_1, \ldots, I^{T_1-1}\}, ED_1, \{1, \ldots T_1-1\}, \{p_1, p_2, p_3\})$, and the TSDF is updated at frame $T_1$ as $$F^{T_1} := F(\{I^1, \ldots, I^{T_1}\}, ED^1, \{T_1\}, \{p_1, p_3\}) \oplus F(\{I^{T_1}\}, \emptyset, \{T_1\}, \{p_2\}), \quad (16)$$

where $F(\{I^{T_1}\}, \emptyset, \{T_1\}, \{p_2\})$ is the input TSDF of frame $T_1$ near part 2 and the operation $\oplus$ is the standard $1^{st}$-order TSDF interpolation as illustrated in FIG. 9. Once $F^{T_1}$ is built, a new keyframe is extracted associated with an ED graph $ED^{T_1}$ and the part-tracking process is repeated until another failure at frame $T_2$. The update at frame $T_2$ is then $$F^{T_2} := F(\{F^{T_1}, I^{T_1+1}, \ldots, I^{T_2}\}, ED^1, \{T_2\}, \{p_1, p_2\}) \oplus F(\{I^{T_2}\}, \emptyset, \{T_2\}, \{p_3\}). \quad (17)$$

The overall tracking continues until the end of the sequence as the 1st pass tracking, the intermediate results are tracked meshes, TSDFs and keyframe index sets of all the parts, e.g., in the above case.

A second pass is used to achieve the two goals: 1) whole mesh refinement and 2) inter-frame mesh correspondence. The mesh connectivity will be maintained between every two keyframes identified in the 1st pass, e.g., $\{\{T_E\}, \{T_1, T_E\}, \{T_2, T_E\}\}$ in above case.

Common lifespans are searched for all the parts and the final TSDF at the frame 1 is blended by $$F^1 := F(\{I^1, \ldots, I^{T_E}\}, ED^1, \{1\}, \{p_1\}) \oplus F(\{I^1, \ldots, I^{T_1-1}\}, ED^1, \{1\}, \{p_2\}) \oplus F(\{I^1, \ldots, I^{T_2-1}\}, ED^1, \{1\}, \{p_3\}) \quad (18)$$

From the blended TSDF at frame 1, the final output mesh $M^1_{out}$ is extracted and built with a new ED graph. Next, $M^1_{out}$ is tracked as a whole mesh to the input sequence by establishing correspondences of the results in the 1st pass. A vertex correspondence set $C_{ref}$ is built by shooting lines from the new vertex set to the previous keyframe and recording the barycentric coordinates of the intersected points. The whole mesh tracking is performed with the same optimization Equation 3 for $t=2, \ldots, T_1-1$. In each frame, the target points in $C_{ref}$ are updated by interpolating with barycentric coordinates on the previous tracked mesh. The pruned correspondence set $Prune(C_{ref} \cup (\cup_v C^{vc}_{orr}))$ is used in the term instead. The output mesh sequence from frame $t=1, \ldots, T_1-1$ is able to be represented by $$M_{out}^t = ED_1(M_{out}^1, t). \quad (19)$$

Since the part segmentation has been performed at keyframes, a mesh operation is defined to select a submesh from the whole mesh by partition labels M(P). At frame $T_1$, a local re-mesh is built in the following: the refined mesh $M^{T_1}_{tmp}$ is extracted from the blended TSDF $F^{T_1}$ as $$F^{T_1} := F(\{I^1, \ldots, I^{T_E}\}, ED^1, \{1\}, \{p_1\}) \oplus F(\{I^{T_1}, \ldots, I^{T_2}\}, ED^1, \{1\}, \{p_2\}) \oplus F(\{I^1, \ldots, I^{T_1-1}\}, ED^1, \{1\}, \{p_3\}) \quad (20)$$

and the keyframe at $T_1$ is built by $$M_{out}^{T_1} := Bridge(M_{out}^{T_1}(\{p_1, p_3\}), M_{tmp}^{T_1}(\{p_2\})), \quad (21)$$

where the operation Bridge assumes that there are two edge loops from two neighboring patches and sews the gap between loops. FIG. 9 shows an example of a Bridge operation. The operation preserves mesh connectivity by locking original vertices and only adds new triangles in the gap region.

Similarly to frame 1, the new ED graph is built as $ED_{T_1}$, and then the output mesh sequence from frame $t=T_1, \ldots, T_2-1$ is represented with the same mesh connectivity of $M^{T_1}_{out}$:

$$M_{out}^t = ED^{T_1}(M_{out}^{T_1}, t). \quad (22)$$

With another Bridge process performed at frame $T_2$, the final output sequence includes three sub-sequences: $ED_1(M_{out}^1, 1, \ldots, T_1-1)$, $ED_{T_1}(M_{out}^{T_1}, \ldots, T_2-1)$ and $ED_{T_1}(M_{out}^{T_2}, T_2, \ldots, T_E)$, where the mesh connectivity is locally updated at the keyframe for failure parts.

As mentioned above, the top part of FIG. 9 shows TSDF fusion operation, in which an input is fused into the canonical TSDF and also the warped canonical TSDF is able to be fused with the TSDF of an input part. The bottom part of FIG. 9 shows a mesh bridge operation, the gap between two edge loops are connected while maintaining triangles on the original parts.

FIGS. 10 and 11 illustrate results utilizing the mesh tracking method according to some embodiments. FIG. 10 shows the result of MPI Boxing data from a single view RGBD. To simulate the fast motion, the input video is temporally downsampled every 10 frames. The image feature correspondences are shown. FIG. 10 also shows the results of the 1st and 2nd pass respectively. Corresponding vertices are color encoded. The canonical mesh is also compared with VolumeDeform.

FIG. 10 validates the mesh tracking method with the MPI Boxing single-view RGBD sequence. To simulate a faster motion, the original input is accelerated by 10 times, and the tracked and refined mesh sequence is demonstrated qualitatively. The mesh tracking method successfully tracks the whole sequence by using a single keyframe. The 1st pass provides accurate one-to-one mesh vertex correspondence, and the 2nd pass refines the keyframe by recovering a larger arm and some occluded part of the body and also provides one-to-one mesh correspondence.

FIG. 11 demonstrates tracking in a hybrid setup (simulated RGBD from Tsinghua JumpX dataset with 4 views) which includes fewer views than existing FVV methods. The part-based tracking result is comparable to the FVV tracking method. FIG. 11 shows the final refined tracking result. Corresponding vertices are color encoded. The RMS error compared with the groundtruth is plotted.

To utilize the mesh tracking described herein, devices such as digital cameras/camcorders are used to acquire 3D/FVV content. The mesh tracking is able to be implemented with user assistance or automatically without user involvement to efficiently process the 3D/FVV content. Then, upon playback of the acquired content, a more accurate content is displayed (e.g., with fewer or no artifacts).

In operation, the mesh temporal tracking method incorporates a human prior model in mesh tracking with a sparse-view and low resolution setup enabling an automatic semantic human model segmentation and a robust mesh tracking in a noisy mesh sequence with a large amount of outliers. The mesh temporal tracking method reduces the possibility of tracking failure by decomposing the whole mesh tracking into a parallel set of local part tracking and achieves higher temporal consistency of fewer number of reference frames. The mesh temporal tracking method develops a parallelized and more effective solution to reduce the high dimension of key-frame pooling and searching given noisy data and outliers to a set of low dimensional problems.

The mesh tracking method is able to both reconstruct a 3D model sequence from an incomplete or noisy input video and build the inter-frame mesh correspondence. Given the limitations of existing Fusion4D and whole mesh nonrigid tracking approaches, a part-based mesh tracking approach improves the robustness. To track a frame, the whole mesh is segmented into semantic parts via a pre-trained prior, each part is tracked in parallel and stitched seamlessly. After tracking all the frames, keyframes and perform volumetric fusion are identified to refine these reference shapes. With the definition of parts, a second pass tracking is established from the beginning of the sequence to the end by locally re-meshing at keyframes. The final tracked output constructs an efficiently inter-frame encoding. Results demonstrate robust tracking for fast motion and noisy input scene, and a potential benefit in mesh compression.

The mesh tracking method described herein improves the quality and the building mesh correspondence of an input mesh sequence. Additionally, the mesh tracking method which utilizes a part-based mesh tracking algorithm and a part-based local re-meshing pipeline improve tracking robustness and mesh encoding efficiency.

Although the mesh tracking method described herein is focused on shapes of humans, the method is able to be utilized with any object/substance (e.g., animals, plants, buildings, vehicles, toys).

Some Embodiments of Robust Mesh Tracking and Fusion by Using Part-Based Key Frames and Priori Model 1. A method comprising:
   segmenting an object in free viewpoint video content into parts;
   tracking the parts of the object;
   stitching the parts of the object; and
   integrating the parts of the object to regenerate the object.
2. The method of clause 1 further comprising identifying a failure of tracking of a part.
3. The method of clause 2 further comprising implementing part-based keyframe refinement, whole mesh tracking and re-meshing the based on the parts of the object.
4. The method of clause 1 wherein segmenting the object into the parts includes segmenting the object into body parts.
5. The method of clause 1 wherein tracking the parts of the object includes storing position and location information of the parts.
6. The method of clause 1 wherein stitching the parts of the object includes stitching a first part from a first time and a second part from a second time, wherein the first time and the second time are able to be different times.
7. The method of clause 1 wherein integrating the parts of the object ensures that the parts of the object are blended together to present an appearance of a single object.
8. The method of clause 1 further comprising acquiring the free viewpoint video content using at most 10 video cameras.
9. The method of clause 1 further comprising acquiring the free viewpoint video content using video cameras with at least 30 degrees of separation on every axis from other cameras.
10. An apparatus comprising:
    a non-transitory memory for storing an application, the application for:
       segmenting an object in free viewpoint video content into parts;

tracking the parts of the object;
stitching the parts of the object; and
integrating the parts of the object to regenerate the object; and
a processor coupled to the memory, the processor configured for processing the application.

11. The apparatus of clause 10 wherein the application is further for identifying a failure of tracking of a part.

12. The apparatus of clause 11 wherein the application is further for implementing part-based keyframe refinement, whole mesh tracking and re-meshing the based on the parts of the object.

13. The apparatus of clause 10 wherein segmenting the object into the parts includes segmenting the object into body parts.

14. The apparatus of clause 10 wherein tracking the parts of the object includes storing position and location information of the parts.

15. The apparatus of clause 10 wherein stitching the parts of the object includes stitching a first part from a first time and a second part from a second time, wherein the first time and the second time are able to be different times.

16. The apparatus of clause 10 wherein integrating the parts of the object ensures that the parts of the object are blended together to present an appearance of a single object.

17. The apparatus of clause 10 wherein the apparatus is further for acquiring the free viewpoint video content using at most 10 video cameras.

18. The apparatus of clause 10 wherein the apparatus is further for acquiring the free viewpoint video content using video cameras with at least 30 degrees of separation on every axis from other cameras.

19. A system comprising:
a plurality of camera devices each configured for capturing free viewpoint video content;
a first computing device configured for:
segmenting an object in free viewpoint video content into parts;
tracking the parts of the object;
stitching the parts of the object; and
integrating the parts of the object to regenerate the object; and
a second computing device configured for:
rendering the free viewpoint video content on the second computing device.

20. The system of clause 19 wherein the first computing device is configured for identifying a failure of tracking of a part.

21. The system of clause 20 wherein the first computing device is configured for implementing part-based keyframe refinement, whole mesh tracking and re-meshing the based on the parts of the object.

22. The system of clause 19 wherein segmenting the object into the parts includes segmenting the object into body parts.

23. The system of clause 19 wherein tracking the parts of the object includes storing position and location information of the parts.

24. The system of clause 19 wherein stitching the parts of the object includes stitching a first part from a first time and a second part from a second time, wherein the first time and the second time are able to be different times.

25. The system of clause 19 wherein integrating the parts of the object ensures that the parts of the object are blended together to present an appearance of a single object.

26. The system of clause 19 wherein the plurality of camera devices include at most 10 video cameras.

27. The system of clause 19 wherein the plurality of camera devices include video cameras with at least 30 degrees of separation on every axis from other cameras.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
segmenting an object in free viewpoint video content into parts, wherein segmenting is based on determining edges of the parts;
tracking the parts of the object, wherein tracking the parts includes matching and storing position information for the parts, wherein tracking the parts of the object includes distinguishing key frames from non-key frames and matching a parametric model with a key frame or a non-key frame, wherein tracking the parts of the object includes generating keyframe pools, wherein each part is associated with a keyframe pool by identifying a pose of the part, wherein the keyframe pools utilize a hierarchical structure to connect the parts;
stitching the parts of the object, wherein stitching the parts of the object includes stitching a first part from a first time and a second part from a second time, wherein the first time and the second time are different times, further wherein the second part from the second time is used when the first part from the first time is at least partially occluded, wherein the second part from the second time includes minimal or no artifacts as determined by locating artifacts and avoiding frames containing the artifacts; and
integrating the parts of the object to regenerate the object.

2. The method of claim 1 further comprising identifying a failure of tracking of a part, including running a keyframe update wherein a locally re-meshed keyframe is extracted using a volumetric approach on a previous keyframe.

3. The method of claim 2 further comprising implementing part-based keyframe refinement, whole mesh tracking and re-meshing based on the parts of the object.

4. The method of claim 1 wherein segmenting the object into the parts includes segmenting the object into body parts.

5. The method of claim 1 wherein integrating the parts of the object ensures that the parts of the object are blended together to present an appearance of a single object.

6. The method of claim 1 further comprising acquiring the free viewpoint video content using at most 10 video cameras.

7. The method of claim 1 further comprising acquiring the free viewpoint video content using video cameras with at least 30 degrees of separation on every axis from other cameras.

8. An apparatus comprising:
a non-transitory memory for storing an application, the application for:
segmenting an object in free viewpoint video content into parts, wherein segmenting is based on determining edges of the parts;

tracking the parts of the object, wherein tracking the parts includes matching and storing position information for the parts, wherein tracking the parts of the object includes distinguishing key frames from non-key frames and matching a parametric model with a key frame or a non-key frame, wherein tracking the parts of the object includes generating keyframe pools, wherein each part is associated with a keyframe pool by identifying a pose of the part, wherein the keyframe pools utilize a hierarchical structure to connect the parts;

stitching the parts of the object, wherein stitching the parts of the object includes stitching a first part from a first time and a second part from a second time, wherein the first time and the second time are different times, further wherein the second part from the second time is used when the first part from the first time is at least partially occluded, wherein the second part from the second time includes minimal or no artifacts as determined by locating artifacts and avoiding frames containing the artifacts; and integrating the parts of the object to regenerate the object; and a processor coupled to the memory, the processor configured for processing the application.

9. The apparatus of claim 8 wherein the application is further for identifying a failure of tracking of a part, including running a keyframe update wherein a locally re-meshed keyframe is extracted using a volumetric approach on a previous keyframe.

10. The apparatus of claim 9 wherein the application is further for implementing part-based keyframe refinement, whole mesh tracking and re-meshing based on the parts of the object.

11. The apparatus of claim 8 wherein stitching the parts of the object includes stitching a first part from a first time and a second part from a second time, wherein the first time and the second time are able to be different times.

12. The apparatus of claim 8 wherein integrating the parts of the object ensures that the parts of the object are blended together to present an appearance of a single object.

13. The apparatus of claim 8 wherein the apparatus is further for acquiring the free viewpoint video content using at most 10 video cameras.

14. The apparatus of claim 8 wherein the apparatus is further for acquiring the free viewpoint video content using video cameras with at least 30 degrees of separation on every axis from other cameras.

15. A system comprising:
a plurality of camera devices each configured for capturing free viewpoint video content;
a first computing device configured for:
segmenting an object in free viewpoint video content into parts, wherein segmenting is based on determining edges of the parts;
tracking the parts of the object, wherein tracking the parts includes matching and storing position information for the parts, wherein tracking the parts of the object includes distinguishing key frames from non-key frames and matching a parametric model with a key frame or a non-key frame, wherein tracking the parts of the object includes generating keyframe pools, wherein each part is associated with a keyframe pool by identifying a pose of the part, wherein the keyframe pools utilize a hierarchical structure to connect the parts;
stitching the parts of the object, wherein stitching the parts of the object includes stitching a first part from a first time and a second part from a second time, wherein the first time and the second time are different times, further wherein the second part from the second time is used when the first part from the first time is at least partially occluded, wherein the second part from the second time includes minimal or no artifacts as determined by locating artifacts and avoiding frames containing the artifacts; and
integrating the parts of the object to regenerate the object; and
a second computing device configured for:
rendering the free viewpoint video content on the second computing device.

16. The system of claim 15 wherein the first computing device is configured for identifying a failure of tracking of a part, including running a keyframe update wherein a locally re-meshed keyframe is extracted using a volumetric approach on a previous keyframe.

17. The system of claim 16 wherein the first computing device is configured for implementing part-based keyframe refinement, whole mesh tracking and re-meshing based on the parts of the object.

18. The system of claim 15 wherein segmenting the object into the parts includes segmenting the object into body parts.

19. The system of claim 15 wherein integrating the parts of the object ensures that the parts of the object are blended together to present an appearance of a single object.

20. The system of claim 15 wherein the plurality of camera devices include at most 10 video cameras.

21. The system of claim 15 wherein the plurality of camera devices include video cameras with at least 30 degrees of separation on every axis from other cameras.

* * * * *